United States Patent [19]

Burzin et al.

[11] 4,429,106

[45] Jan. 31, 1984

[54] METHOD OF PRODUCING POLYPHENYLENE OXIDES USING MORPHOLINIUM BROMIDE AS ACTIVATOR

[75] Inventors: Klaus Burzin, Marl; Martin Bartmann, Recklinghausen; Hanns-org J. Bax, Marl; Wilfried Ribbing, Dorsten, all of Fed. Rep. of Germany

[73] Assignee: Chemische Werke Huels AG, Marl, Fed. Rep. of Germany

[21] Appl. No.: 497,237

[22] Filed: May 23, 1983

[30] Foreign Application Priority Data

Jul. 2, 1982 [DE] Fed. Rep. of Germany ....... 3224692

[51] Int. Cl.³ .............................................. C08G 65/44
[52] U.S. Cl. ................................... 528/216; 528/212; 528/214; 528/215; 528/217
[58] Field of Search ......................... 528/212, 214–217

[56] References Cited

U.S. PATENT DOCUMENTS

| 3,642,699 | 2/1972 | Cooper et al. | 528/216 |
| 3,733,299 | 5/1973 | Cooper et al. | 528/216 |
| 3,796,689 | 3/1974 | Bennett et al. | 528/216 |
| 4,028,341 | 6/1977 | Hay | 528/216 |
| 4,092,294 | 5/1978 | Bennett, Jr. et al. | 528/216 |

*Primary Examiner*—Lester L. Lee
*Attorney, Agent, or Firm*—Oblon, Fisher, Spivak, McClelland & Maier

[57] ABSTRACT

A high molecular-weight polyphenylene oxide is produced by the oxidative coupling of a diortho-substituted phenol in the presence of a copper amine complex and an activator of morpholinium bromide and an alkali metal hydroxide or alkaline earth hydroxide.

11 Claims, No Drawings

METHOD OF PRODUCING POLYPHENYLENE OXIDES USING MORPHOLINIUM BROMIDE AS ACTIVATOR

BACKGROUND OF THE INVENTION

1. Field of the Invention

This invention relates to a method of producing high-molecular weight polyphenylene oxide (PPO) by the oxidative coupling of a diortho-substituted phenol in the presence of a catalyst complex of a copper salt and an amine and an activator of morpholinium bromide and alkali.

2. Description of the Prior Art

PPO and methods of producing it are known. Some of these methods are described in Buhler "Spezialplaste" (Akademieverlag Berlin, 1978) and in U.S. Pat. Nos. 3,306,874 and 3,306,875 and in DE-AS No. 22 17 161. However, the methods which involve the oxidative coupling of diortho-substituted phenols in the presence of oxygen by a copper-amine complex have prevailed in industry.

PPO of high molecular-weight can be obtained by the method of DE-OS No. 24 46 425. However, this method is avoided in practice due to the use of very high pressure which involves considerable expense for equipment and safety measures.

DE-OS No. 25-30-827 discloses the use of a catalyst in the preparation of high molecular-weight PPO which contains a copper-amine complex, a metallic bromide, and a quaternary ammonium salt, $+NR_4X-$, wherein R is an alkyl, alkenyl or aralkyl radical and X is any anion. The quaternary ammonium salt is, preferably, methyl tri-n-octyl ammonium chloride.

DE-OS No. 22 28 071 describes a method of producing PPO in which phenols are treated with oxygen in the presence of a copper-amine complex and a metal bromide. Further DE-OS No. 22 28 071 discloses that while an accelerating effect is observed for alkali and alkaline earth bromides, such an effect is not observed for non-metallic bromides, such as ammonium bromide.

Japanese Pat. No. Sho-48-32793 discloses a method for producing PPO which uses a catalyst consisting of:
(1) a copper (I) salt,
(2) a compound of an alkali or alkaline earth element which reacts in an alkaline manner, such as lithium carbonate, sodium hydroxide or potassium acetate, and
(3) a nitrile, e.g. propionitrile or phthalodinitrile.

No. Sho-48-32793 teaches the use of this catalyst, instead of a copper-amine complex. Moreover, the oxidation occurs with oxygen or a mixture of oxygen and air in a 1:1 ratio.

None of the methods described heretofore are completely satisfactory in practice. First, oxygen is usually required as an oxidizing agent. In addition to the greater expense which is associated with the use of oxygen, as compared to air, the use of pure oxygen also involves a greater risk to safety.

Secondly, benzene or solvents containing chlorine, such as trichloroethylene, are frequently used in methods currently used to produce PPO. However, due to the suspected carcinogenic nature of these solvents, it would be preferable to avoid their use.

Thirdly, the reaction time for PPO production should be under two hours in order to assure that the reaction procedure is economical. Moreover, if the reaction time is longer than two hours, by-products may easily be formed which add a disturbing discoloration to the reaction mixture.

Finally, a high degree of polymerization is also important. A degree of polymerization of 100 is required for manufacturing threads, fibers, coatings and other products, and a degree of polymerization of 250 is preferred, so that a subsequent molding deformation is completely assured. See DE Pat. No. 20 12 443. This corresponds to a J-value of 50, that is, the relative viscosity change of a 0.5% solution of the reaction product is chloroform at 20° C. in relation to the concentration is over 50 ml/g.

Therefore, a need continues to exist for a process which produces high-molecular weight PPO in a short reaction time, without having to use pure oxygen as an oxidizing agent, and with minimal risk to safety.

SUMMARY OF THE INVENTION

Accordingly, it is an object of this invention to provide a process for producing PPO of high molecular-weight utilizing short reaction times.

It is also an object of this invention to provide a process for producing PPO having a high degree of polymerization.

Further, it is an object of the present invention to provide for producing PPO of high molecular-weight without having to use pure oxygen as an oxidizing agent and with minimal risk to safety.

According to the present invention, the foregoing and other objects are attained by providing a process for producing PPO of high molecular-weight with a relative viscosity change greater than 50 ml/g in relation to the concentration, measured in a 0.5% solution in chloroform at 25° C., by the oxidative coupling of a diortho-substituted phenol in the presence of a copper-amine catalyst and an activator of morpholinium bromide and an alkali or alkaline earth hydroxide.

DETAILED DESCRIPTION OF THE PREFERRED EMBODIMENTS

According to the invention, PPO of high molecular-weight is produced by the oxidative coupling of a diortho-substituted phenol in the presence of a copper-amine catalyst and an activator of morpholinium bromide and an aqueous solution of an alkali or an alkaline earth hydroxide. Generally, an excess of the alkali or alkaline earth hydroxide is used in relation to the morpholinium bromide. The alkaline solution should contain 20 to 60%, preferably 30 to 50% metal hydroxide. Thus, for each 100 moles of phenol, there are 1 to 25, preferably 2 to 10 moles of alkali or alkaline earth hydroxide, and 0.1 to 20, preferably 1 to 7 moles of morpholinium bromide.

The polymerization reaction of this invention occurs, preferably, in aromatic solvents such as toluol, xylol and o-dichlorobenzene. It is useful to prepare the solvent first, then add the copper salt, amine and morpholinium bromide, and finally add a mixture of aqueous hydroxide solution and phenol in the solvent. The reaction is usually performed in a temperature range of 20° to 80° C., and it is particularly advantageous to perform the reaction at temperatures between 30° and 40° C.

The method of the invention may be performed with oxygen, oxygen-air mixtures or nitrogen-air mixtures as desired, provided that the gas mixture contains at least 10% oxygen. It is possible to obtain even better results in a shorter time with air mixtures enriched with oxygen; however, this involves greater expense for safety.

As is known, a copper (I) or a copper (II) salt and a primary, secondary or tertiary amine are used as a copper-amine catalyst. Suitable copper salts are copper (I) chloride, copper (I) acetate, copper (II) chloride, copper (II) acetate, copper (II) sulfate, copper (II) carbonate and copper (II) bromide.

Suitable amines are butyl amine, dibutyl amine, dimethyl amine, pyridine and other such amines. However, morpholine is the preferred amine.

As the presence of copper in the end product is undesirable, the concentration of the copper-amine catalyst is kept as low as possible, preferably in the range of 0.1 to 2.5 moles per 100 moles phenol.

In addition to morpholinium bromide, suitable catalysts contain a 20 to 60% aqueous solution or suspension of an alkali or alkaline earth hydroxide such as sodium, potassium, calcium or barium hydroxide.

2,6-diaryl phenols, especially 2,6-diphenyl phenol, may be used with success. However, it is preferable to use 2,6-di-n-alkyl phenols, whose alkyl radicals have 1 to 6 carbon atoms, as the diorthosubstituted phenols. The highest degrees of polymerization are obtained using 2,6-dimethyl phenol. Reaction solutions containing 5 to 40% by weight of phenol monomer are customarily employed.

The present invention will be further illustrated by certain examples and references which are provided for purposes of illustration only and are not intended to limit the present invention.

EXAMPLE 1

800 g toluol, 2 g copper (II) chloride, 200 g morpholine and 5 g morpholinium bromide were mixed in a 2 l agitating reactor. After the addition of 100 g 2,6-dimethyl phenol dissolved in 100 g toluol and 4 g 50% aqueous sodium hydroxide solution, an air current of 200 l/h was introduced by a dip pipe and the polymerization was started.

The temperature of the reaction mixture was held between 30° and 35° C. After 90 minutes, the reaction was stopped by the addition of 400 g 50% acetic acid. After phase separation, the polymer was precipitated from the toluolic phase by the addition of 800 g methanol.

The relative viscosity change (J-value) of the polymer obtained in relation to the concentration was determined from a 0.5% solution in chloroform at 25° C. and is illustrated in Table 1.

EXAMPLES 2 TO 5 AND A TO E

The same method was employed as in Example 1, however the activator was changed. The results of this change are illustrated in Table 1.

TABLE 1

| Example No. | Activator | J-Value ml/g |
| --- | --- | --- |
| 1 | 5 g Morpholinium bromide + 4 g NaOH (50%) | 58 |
| 2 | 5 gm Diethylammonium bromide + 4 g NaOH | 56 |
| 3 | 4 g Dimethylammonium bromide + 4 g NaOH | 52 |
| 4 | 7.5 g Morpholinium bromide + 4 g NaOH | 60 |
| 5 | 5 g Morpholinium bromide + 4 gm Ca(OH)₂ (33%) | 56 |
| A | | 35 |
| B | 9 g NaBr | 36 |
| C | 5 g Morpholinium bromide | 44 |
| D | 9 g NaOH (50%) | 40 |
| E | 4 g NaOH (50%) + 5 g NaBr | 42 |

The examples according to the invention are indicated by numbers 1–5 and the comparison examples are indicated by letters A–E. Table 1 illustrates that satisfactory J-values are obtained neither solely with sodium hydroxide, nor solely with sodium bromide. Moreover, J-values obtainable with the present invention are not obtained with an activator consisting of both sodium hydroxide and sodium bromide. Table 1 indicates that J-values of Examples 1–5 are all in excess of 50 ml/g.

Obviously, many modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A method of producing a high molecular-weight polyphenylene oxide, having a relative viscosity change in relation to the concentration greater than 50 ml/g, measured in a 0.5% solution in chloroform at 25° C., comprising the oxidative coupling of a diortho-substituted phenol having the formula:

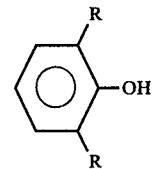

wherein R is an n-alkyl radical with 1 to 6 carbon atoms or an aryl radical, in the presence of an oxidizing agent, an organic solvent, a copper-amine catalyst, which comprises a copper salt and an amine, and an activator, which comprises morpholinium bromide and a 20 to 60% solution or suspension of an alkali or alkaline earth hydroxide, in a temperature range of 20° to 80° C., wherein X moles of alkali or alkaline earth hydroxide, and y moles of morpholinium bromide are used per 100 moles of said phenol, wherein $1 < x < 25$, $0.1 < y < 20$, and $y < x$.

2. The method according to claim 1, wherein $2 < x < 10$, and $1 < y < 7$.

3. The method according to claim 1, wherein said oxidizing agent is oxygen, a mixture of oxygen-air, a mixture of nitrogen-air, air, or a mixture thereof wherein said oxidizing agent comprises at least 10% oxygen.

4. The method according to claim 1, wherein the amine of said copper-amine catalyst is selected from the group consisting of butyl amine, dibutyl amine, dimethyl amine, pyridine and morpholine.

5. The method according to claim 4, wherein the amine of said copper-amine catalyst is morpholine.

6. The method according to claim 1, wherein the phenol is 2,6-dimethyl phenol.

7. The method according to claim 1, wherein the diortho-substituted phenol is 2,6-diphenyl phenol.

8. The method according to claim 1, which comprises adding the copper salt, the amine, and the morpholinium bromide to the organic solvent, and then adding a mixture of aqueous alkali or alkaline earth hydroxide solution and the phenol to said organic solvent.

9. The method according to claim 1, wherein the temperature is in the range of 30° to 40° C.

10. The method according to claim 1, wherein the concentration of the copper amine catalyst is in the range of 0.1 to 2.5 moles per 100 moles of phenol.

11. The method according to claim 1, wherein the organic solvent is an aromatic organic solvent selected from the group consisting of toluol, xylol, o-dichlorobenzene, or a mixture thereof.

* * * * *

UNITED STATES PATENT AND TRADEMARK OFFICE
CERTIFICATE OF CORRECTION

PATENT NO. : 4,429,106

DATED : January 31, 1984

INVENTOR(S) : Klaus Burzin et al

It is certified that error appears in the above-identified patent and that said Letters Patent is hereby corrected as shown below:

On the title page:

--[75] Klaus Burzin, Marl; Martin Bartmann, Recklinghausen, Hanns-Jorg J. Bax, Marl; Wilfried Ribbing, Dorsten all of Fed. Rep. of Germany Assignee: Chemische Werke Huls AG , Marl, Fed. Rep. of Germany --

Signed and Sealed this

Twenty-ninth Day of May 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,429,106

DATED : January 31, 1984

INVENTOR(S) : KLAUS BURZIN ET AL

It is certified that error appears in the above-identified patent and that said Letters Patent is hereby corrected as shown below:

On the title page, Item [75] should read:

--[75] Inventors: Klaus Burzin, Marl; Martin Bartmann, Recklinghausen, Hanns-Jörg Bax, Marl; Wilfried Ribbing, Dorsten, all of Fed. Rep. of Germany.--

Signed and Sealed this

Second Day of April 1985

[SEAL]

Attest:

DONALD J. QUIGG

Attesting Officer      Acting Commissioner of Patents and Trademarks